United States Patent [19]

Belsterling et al.

[11] Patent Number: 4,536,690
[45] Date of Patent: Aug. 20, 1985

[54] TOOL-SUPPORTING SELF-PROPELLED ROBOT PLATFORM

[75] Inventors: Charles A. Belsterling, Norristown; Robert K. Soberman, Philadelphia, both of Pa.

[73] Assignee: Calspan Corporation, Buffalo, N.Y.

[21] Appl. No.: 435,212

[22] Filed: Oct. 19, 1982

[51] Int. Cl.³ ............................................. G05B 19/40
[52] U.S. Cl. .................................. 318/687; 318/568; 434/58
[58] Field of Search ................... 318/687, 568; 434/58; 180/98

[56] References Cited

U.S. PATENT DOCUMENTS

| Re. 27,436 | 7/1972 | Sawyer | 346/29 |
|---|---|---|---|
| 3,357,511 | 12/1967 | Mackie | 180/7 |
| 3,628,624 | 12/1971 | Wesener | 180/98 |
| 3,653,456 | 4/1972 | Uemura | 180/98 |
| 3,836,835 | 9/1974 | Sawyer | 318/685 |
| 3,881,139 | 4/1975 | Inaba et al. | 318/38 |
| 3,904,897 | 9/1975 | Shichida et al. | 310/12 |
| 3,904,900 | 9/1975 | Shichida et al. | 310/12 |
| 3,906,262 | 9/1975 | Shichida et al. | 310/12 |
| 3,912,037 | 10/1975 | Krieg | 180/98 |
| 3,935,486 | 1/1976 | Nagashima | 310/12 |
| 4,028,533 | 6/1977 | Matsubara | 235/151 |
| 4,078,630 | 3/1978 | Krieg | 180/98 |
| 4,286,197 | 8/1981 | Eberhard et al. | 318/38 |
| 4,343,610 | 8/1982 | Chou | 434/58 |
| 4,432,063 | 2/1984 | Resnick | 318/568 X |

OTHER PUBLICATIONS

"Linear Motion Electric Machines", Nasar and Boldea, Wiley & Sons 1976, pp. 20, 21, 90, 91, 110-113.

*Primary Examiner*—William M. Shoop
*Assistant Examiner*—Saul M. Bergmann
*Attorney, Agent, or Firm*—Dann, Dorfman, Herrell and Skillman

[57] ABSTRACT

A self-propelled robot platform consists of a frame with a plurality of casters to support the frame on and space the frame from a supporting surface, as well as permitting any selected direction of movement over the support surface. At least two linear motors are arranged on the frame transversely to one another and generally parallel to the support surface and so that their flux links the support surface. The support surface is preferably a conductor such that by a combination of signals to the respective motor means, the motor fluxes linking the supporting surface will drive the platform. The platform is provided with tool support means and that tool support means includes articulation structure with associated drive means which permits tool positioning. As a consequence, the robot platform may be moved over the surface in a predetermined pattern doing work with a supported tool or it may be moved from point to point where work is to be done where the tool is actuated either manually or by programmed information. If the support surface is magnetic, the surface need not be horizontal to hold the platform.

A system for driving the platform includes input means for selecting platform movement and tool operation, which may include both manual and computer control. The input means, in turn, drives control means to select the appropriate linear motor means at a given time and sequence to achieve desired movement. Control means selects the motors to be energized by a power source. A means is also provided to drive the respective drive means of the articulation structure to produce desired tool movement. Both platform and tool position sensing signals are preferably fed back to the drive means to correct their drive signals.

23 Claims, 12 Drawing Figures

TOOL-SUPPORTING SELF-PROPELLED ROBOT PLATFORM

The present invention relates to a self-propelled robot platform for cooperative use in connection with a supporting conductive surface, which may be a magnetic surface permitting magnetic retention of the platform if a non-horizontal surface is employed. The invention also relates to a system for positioning and operating a tool-supporting self-propelled robot platform in relation to such a supporting surface.

BACKGROUND OF THE INVENTION

Linear induction motors (LIMs) have come into increasing use as a means of propelling various types of vehicle along tracks. Typical of such vehicle, for example, is a monorail. Commonly, the linear induction motor or motors employed provide magnetic linkage with a steel rail which magnetically attracts the LIM and allows it to be propelled due to the moving field which progresses along the LIM in a direction in line with the direction of movement along the rail, while being guided by the rail.

Proposals and concepts for employing LIMs are many and varied. While many have used the same track which the vehicle is to follow, in some cases, the "tracks" have actually been two dimensional, e.g., in a checkerboard pattern of conductors and non-conductors, and LIMs have been proposed to be arranged at right angles to one another in order to afford movement of the vehicle in stepwise fashion, the steps provided by the checkerboard permitting the LIMs so oriented to alternatively move the vehicle either way. Such vehicles have been primarily curiosities and have found no widespread use, even though LIMs following predetermined track have been used for many years.

THE NATURE OF THE INVENTION

The present invention relates to a novel concept in which robot platforms are able to be directed over appropriate supporting surfaces which are not provided with track as such but which are metallic and preferably magnetic metallic material or are conductors with are magnetic field permeable which may, or may not be, associated with a similar, but passive magnetic robot platform on the other side of the supporting surface. While the concept includes a movable opposed magnetic structure, it is preferred to have the metal fixed and extending over the region to be covered.

The concept permits the platform to move in any direction over the surface, to climb walls or cooperate with surfaces which are not necessarily horizontal, or to move over three-dimensionally contoured surfaces. For example, the present invention contemplates the use of such robot platforms on steel ship hulls which are neither planar nor horizontal. The advantage of the LIM on non-horizontal surfaces is particularly great since the very field which causes propulsion also provides attraction to a supporting surface of magnetic material and holds the LIM in place against such a supporting surface as it moves. Furthermore, such platforms are not deterred by atmospheric conditions and can move into polluted atmospheres or even move between air and water over a contoured non-horizontal surface, such as the hull of a ship.

Because the movable robot platform is capable of motion in any selected direction by taking incremental steps along each of two orthogonal directions, for example, substantial surface areas can be thoroughly covered by the robot or by some tool supported on the robot such as a scraper or painting equipment, for example.

The robot platform is also preferably provided with tool supporting means including articulated structure permitting tool position adjustment whereby a tool supported on the robot platform may do predetermined work at predetermined locations of the platform on the supporting surface. This may be coordinated with movement of the robot platform, for example, from point-to-point at which work is to be done, possibly reorienting the platform for performance of a particular work task using drives to move the tool support articulation. Alternatively, it may involve work with proceeds continuously, or intermittently, as the robot platform moves, using the drives to correct tool position. The tool supporting means preferably and primarily includes rotatable as well as all other types of motion. In preferred embodiments, the articulated structure might include a universally positionable tool support member provided with six degrees of freedom, sometimes referred to as a synergistic positioner. Such a device is similar to that provided as a flight simulator in U.S. Pat. No. Re. 27,051, the invention of Klaus L. Cappel, to which reference is made for a more complete explanation. Such a device preferably is driven by individual actuators for each of its legs. Alternatively, or additionally, it may have resilient positioning means in one or more of the legs urging the supported tool into the surface to provide some snag release and surface-contour-following features.

More specifically, the self-propelled robot platform of the present invention cooperates with a supporting surface permitting magnetic retention and drive of the platform. The robot platform is built about a supporting frame having a plurality of means supporting the frame on the supporting surface close enough for flux coupling and capable of permitting movement of the frame relative to the surface. The means may be air pads or low friction skids, but in most applications will be rolling members, which rest on the supporting surface and provide means of supporting and spacing the frame from the surface as well as permitting movement over the surface in any selected direction. A plurality of linear motor means are fixed to the frame in positions to magnetically link the surface or means integral with and generally conforming to the surface to hold the platform against the supporting surface. The linear motor means are oriented such that by combination signals to the respective motor means, the motor means can drive the platform in a variety of selected directions along a selected path or in a selected pattern. Tool support means is supported on the platform and preferably includes articulation structure permitting tool position adjustment relative to the frame, whereby a tool supported on the tool support means may do predetermined work at predetermined locations and orientations of the platform.

A system for positioning and operating a tool supporting self-propelled robot platform is also contemplated in accordance with the present invention. This system includes a robot platform of the type described, signal generation means for generating motor drive signals for the motor means to cause movement of the platform relative to the support surface. It also includes selection and direction control means determining selection of which of the motor means, when and in what sequence. Computer means is provided containing program information positioning the tool support in various positions and orientations of the platform on the support surface. Input means is provided for selecting platform coverage and tool operation.

In the usual case where the tool support means is driven, the system includes drive means for positioning the tool support means to properly position the tool relative to the support surface carrying the platform and relative to the structure on which work is to be done, as well as for operating the tool. Where the drive means employs a plurality of drive elements, a separate drive sequence control may be employed. The drive sequence control, in turn, may be controlled by the computer means to achieve desired position and orientation of the robot platform at successive times and to control the movement of the tool in accordance with predetermined information. Manual input means may be also used to control the tool positioning or to preselect a particular program for tool use as well as for the movement pattern for the robot platform.

SPECIFIC DESCRIPTION OF THE DRAWINGS

The present invention will be better understood by reference to the accompanying drawings in which.

DESCRIPTION OF THE PREFERRED EMBODIMENTS OF THE PRESENT INVENTION

Figure 1:
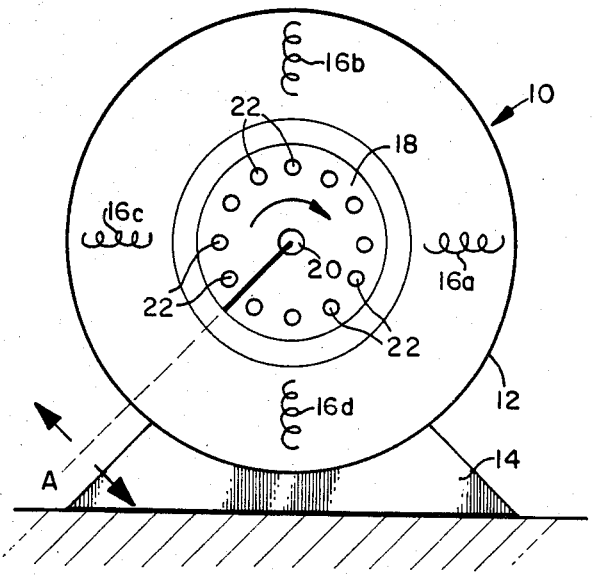
FIG. 1 is a conventional squirrel cage induction motor.

The rotary induction motor 10 illustrated in FIG. 1 is perhaps the most simple, reliable electric motor in existence and is commonly used in electrical appliances, and particularly in industrial equipment. The rotary motor represented schematically in FIG. 1 has a stationary housing 12 supported on a base 14 enabling mounting to equipment, or the like. The housing 12 contains a stator employing conductive, mutually insulated windings 16a, 16b, 16c and 16d on magnetic pole pieces, not specifically shown, but arranged symetrically at equal intervals about the armature. The individual pole positions are here represented by windings and are subjected to a simulated rotating field provided by a multiphased power supply. The rotating magnetic field crosses the air gap between the power assembly and extends into a passive rotor 18 supported on, and driving, a shaft 20. The magnetic fields from the poles link the conductors 22 and as the field expands and contracts it cuts the conductors and induces a current in them. The current in the armature conductor, in turn, produces a magnetic field which causes the motor to rotate with the rotating magnetic field of the stator.

Figure 2:
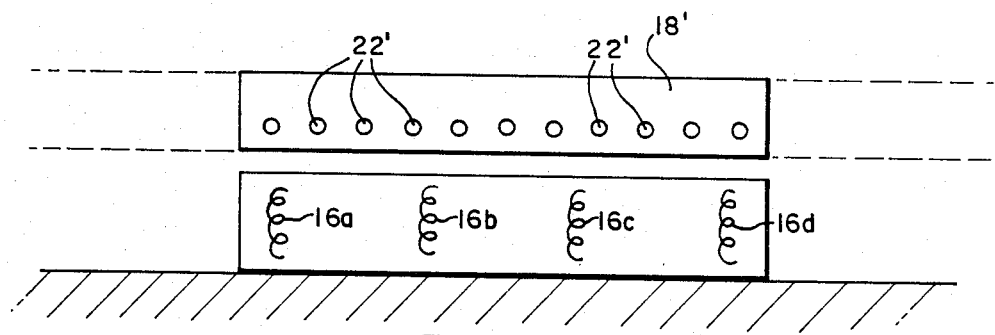
FIG. 2 is a linear motor representation showing conceptually how the squirrel cage induction motor is converted to linear form.

FIG. 2 represents the equivalent of the motor of FIG. 1 effectively cut through in a radial plane A and laid flat to provide what becomes a linear induction motor. If the cut is made along line A, the poles represented by winding 16c', 16b', 16a', and 16d' retain the same sequence. The conductors 22' are no longer on the rotor but on a slide 18' which moves relative to the fixed windings in a linear direction parallel to the field array. As a practical matter in a linear induction motor (LIM), it is usually more economical to provide the individual poles on the movable portion and conductors 18, or their equivalent conductive surface, as a track. In either event, when multi-phase power is applied to the windings, a sweeping magnetic field running linearly in one direction and repeating causes a thrust against the movable portion in the direction the field appears to be sweeping relative to the fixed track. Since the powered assembly is basically an A.C. electromagnet, if the plate is of magnetic material, such as steel, there exists a force of attraction between it and the track. The force of attraction can be 10 times the thrust. However, if the plate is aluminum, there can be a force of repulsion equal to the thrust.

In a typical LIM there frequently are many more poles provided than schematically illustrated in FIG. 2. The poles are magnetically interconnected and are built up with laminated steel stampings with copper wire laid into the slots like any motor or transformer winding. Typically, this assembly is potted in synthetic material to make it safe and reliable in its more exposed environment. In a typical vehicular arrangement, a LIM might use a steel rail of I-beam form as the passive element wherein the LIM assembly of stampings and windings is mounted on wheels positioned such that a rail surface is within a fraction of an inch of the magnetic pole faces. In such a system, the vehicle will be propelled along the rail without physical contact of the magnetic pole faces and without traction problems.

The applicants are familiar with and have worked with LIMs which have been designed with their participation by The Franklin Institute, the assignee of the present invention, for overhead monorail systems wherein a LIM was mounted under each of two sets of supporting wheels facing the underside of the guideway I-beam. The LIMs were mounted on a platform with small wheels at the ends to maintain a minimum air gap and avoid magnetic lock-up. In a situation where gross weight of the loaded vehicle was 6,000 pounds, two 350 pound thrust LIMs were able to provide more than 0.10 g of acceleration. It is interesting to note that the force of attraction (10 times the thrust) was great enough to lift the monorail vehicle off its supporting wheels thereby eliminating all running friction during acceleration. Speed was automatically controlled by a closed loop system using a tachometer and variable-voltage motor controller. The specific system was operated successfully over a period of about six years and was assessed by the Urban Mass Transit Authority (UMTA) as an acceptable operational people-mover.

The applicants have had experience with other LIM-propelled vehicles as well and believe that such vehicles are suitable for the applications described herein.

Figure 3:
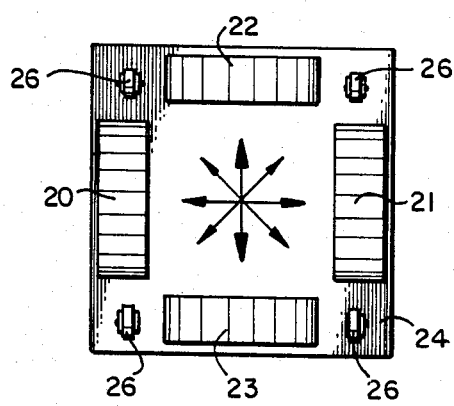
FIG. 3 shows a movable robot platform in accordance with the present invention from below without regard to tools which may be supported on the platform.

Referring now to FIG. 3, movable platform propelled by four LIMs is illustrated. The four LIMs 20 and 21 and 22 and 23 are arranged along the edges of a generally square platform frame 24 with LIMs 20 and 21 parallel to one another and LIMs 22 and 23 parallel to each other such that the linear direction of each of the parallel LIMs is mutually perpendicular to one another. Supporting the square or rectangular platform are a plurality, and typically four, identical casters 26 which are preferably supported in swivel sockets permitting rotation about an axis perpendicular to the platform and permitting a rolling on the platform by their wheels. Alternatively, ball bearings supported from the platform by a ball retaining housing may serve to permit rolling of the platform relative to a supporting surface. The bearings or casters 26 are designed and positioned on the frame 24 to permit accurate close spacing of the magnetic poles of the LIMs from the supporting surface. Other supporting means such as air pads or low friction skids may be substituted for rolling supports in certain applications.

By imposing the same fields on a parallel pair of LIMs, the platform can be driven in a straight line parallel to the extension of the LIMs. By imposing opposite magnetic wave flow on the fields on the LIMs, the platform can be rotated or its orientation changed to the supporting surface. By orienting LIMs transverse to one another, and preferably orthogonally to one another, a diagonal vector path intermediate that produced by the transverse LIMs can be achieved. It is possible to obtain path directions at various angles by varying field strengths of the LIMs but for practical purposes, by using one set of the LIMs or the other, a stepwise pattern which if taken in small enough increments can conform to almost any pattern or curve desired may be employed. Furthermore, the LIM may be patterned to cover an area by using various possible paths, similar to those a mower might take in cutting a lawn.

Figure 4:
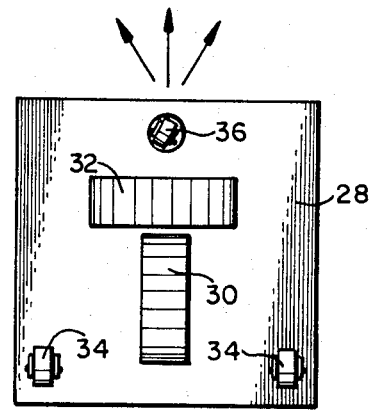
FIG. 4 illustrates another configuration of linear induction motors on a robot platform.

FIG. 4 shows a alternate arrangement of a steerable platform wherein two separate LIMs are placed at right angles to each other. In this case, one LIM 30 is placed on a middle line of the rectangular platform in the direction of primary motion. A second steering LIM 32 is placed in the position of a "T" crossbar and acts as a steering LIM. In this embodiment, a pair of fixed rollers 34 may be placed at one end and a swivel passive roller caster 36 placed at the front end to accommodate to the steering action of the steering LIM 32. The arrangement of FIG. 4 has some advantage for a manual operation in that the steering LIM could be provided with variable thrust and controlled by a variable manual stick. The platform of FIG. 3, on the other hand, must be vectorially directed and, assuming that the LIMs are all actuated at the same level, the vectors shown illustrate the various directions in which the platform could be moved.

In order for such a platform to move under the influence of the LIMs, it must be supported on a conductive surface or a conductive surface must be provided generally parallel to and usually integral with the supporting surface. Alternatively, a dummy platform could be provided on the opposed side of the conductive surface, but the platform should be simply provided with magnetic cores designed to complete the flux paths of the respective LIMs, rather than providing active LIMs on opposite sides of the structure and must be able to follow and move with the main robot platform, which among other things assumes absence of obstructions on both sides of the supporting surface.

It will, of course, be recognized that in addition to the large LIMs shown, groups of smaller LIMs in similar overall configuration or other types of configurations can be used to provide modifications of the platform shown in FIGS. 3 and 4. For efficient generation of thrust, the air gap between the LIMs and the conductive surface should be kept small, typically $\frac{1}{8}$ to $\frac{1}{4}$ of an inch. If the conductive surface is below the supporting surface, this means that the supporting layer must be thin and the rollers or other supporting means must carry the platform particularly close to the supporting surface. If the supporting surface is irregular or has appreciable contour, each LIM may be suspended from the platform on an articulated carriage with its own skateboard wheels to enable it to be adjustably positioned relative to the surface with which it must cooperate. For extreme contours, the designer would choose a group of short motors, rather than one long one, each short motor articulated to track the surface of the contoured supporting surface.

It is possible that a particular supporting surface may be non-conducting or non-magnetic. In such instance, a suitable metallic surface can be laid down and effectively made mechanically integral with the supporting surface.

Each LIM optionally may be controlled with a proportional power controller in a closed loop control system. Both position and velocity feedbacks are preferably provided so that a remote operator or control computer can command movement to a given position at maximum speed or movement at a constant slow rate of speed. Position feedback can be provided, for example, by sensing the motion of the platform support wheels with encoders or synchros, or the like. For the free roaming platform, these wheels may be designed with sensing means to provide a sensed direction vector signal and a linear distance and/or velocity signal which may be resolved for x-y input into a computer. Sensing of at least two wheels may be necessary for sensing platform repositioning operations. For the steerable three-wheeled platform, turns counters on the wheels and angle of steering can be used to continuously monitor motion and permit computation of actual position. Either platform may also be provided with an inertial guidance instrument package as a means of detecting position.

Robot platforms in accordance with the invention may be equipped directly with tools such as polishing tools or scraping tools which work directly on the supporting surface. Such tools may be fixed relative to the platform into a permanent position or may be made retractable into an inoperative position. The tools may be supported by a support which exerts pressure upon the tool and yields to surface irregularities. Alternatively, the tools may be supported on highly sophisticated devices some of which will now be considered.

FIGS. 5 through 8 illustrate essentially the type of robot platforms with various types of support structure thereon. In each case, the platform itself is of the general type shown in FIG. 3 and therefore corresponding parts have been given the same numbers with the addition of a letter suffix to identify the particular superstructure employed. Operation of the robot platform can be understood by reference to the discussion in connection with FIG. 3. These structures also have in common a type of six degree of freedom articulation. They all include a base 38 and a movable tool support 40 in each of which there are three general points of connection, that is, the connections are not literally at a point but are in a localized area which may be thought of roughly as a point and with approach to the point providing the ideal of maximum flexibility. Joining the base 38 and the tool support 48 are six essentially identical extensible and contractable legs 42 arranged such that two of the legs are connected to each of the three points of the base and two of the legs are connected to each of the three points of the tool support but such that no two points are connected together by more than one leg. In accordance with the articulated device of the present invention, the legs are provided with motor drive means of some sort, typically hydraulic cylinders 44 which allow the extension or contraction of each of the legs individually. Using the power to extend and contract, the tool support 38 can be moved from a given position relative to the robot platform in any of three orthogonal rectilinear directions or rotated about axes which are also mutually orthogonal and provide the effects of roll, pitch and yaw. For the most part, any movement or acceleration aspects of the articulated positioning device are less important than the ability to position the platform 40 in a position to hold a tool 46 in proper work aspect. Suffixes are added to the common numbering of parts to identify in which embodiments they occur.

Figure 5:
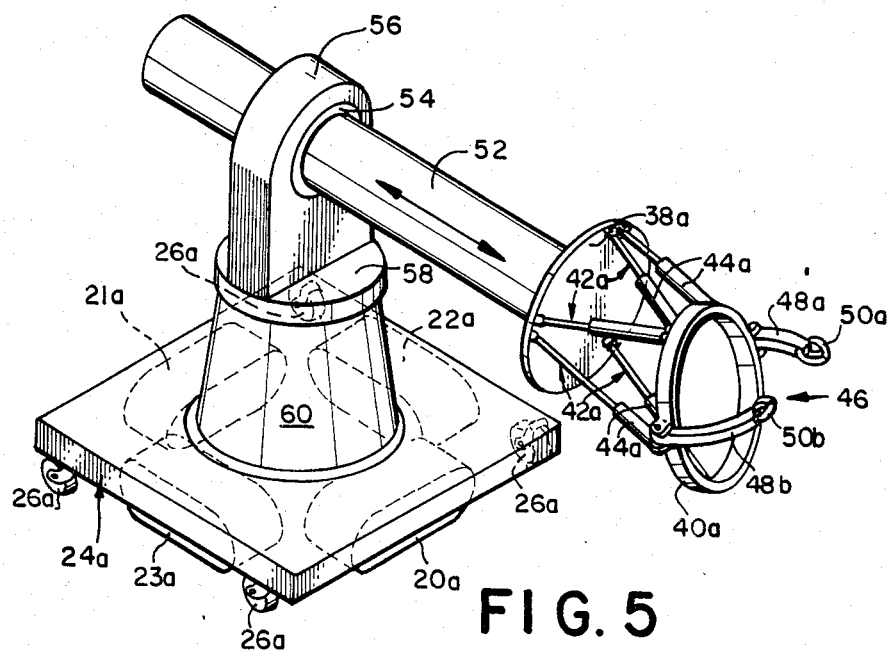
FIG. 5 represents one form of robot platform showing an articulated tool support having an additional rotational feature to orient the base of the articulated structure.

In the particular robot platform of FIG. 5, the base 38a is mounted axially and orthogonally on a shaft 52 which is supported in a bearing 54 in a housing 56 which contains means to move the shaft 52 axially and means to rotate the shaft about its axis, the separate means not being seen in this drawing and being of any possible type well known in the prior art. In addition, the housing 56 is supported on turntable 58 supported on frustoconical pedestal 60 which may also enclose and house a suitable rotational drive to cause the rotation of the whole system about a vertical axis.

The tool mounted on platform 40a in this embodiment consists of a pair of pincher arms 48a and 48b which are pivotally supported on the base 40 extending in a common plane and are rotatably supported by parallel pivot points to permit rotational movement toward or away from one another around their supported pivot points. At their extremeties, remote from the platform 40a, there are provided claw members 50a and 50b. Actuators for the arms and the claws are not illustrated, but it will be understood that either passive loading devices such as springs may be used to hold the arms in selected position permitting them to move against applied resistance or driven actuators may position the arms 48 and other actuators may open and close the claws 50a and 50b.

Thus, to use this highly complex robot, the platform may be moved over a working surface in various directions and/or may be repositioned by its LIM motors. It may then be held in position by the LIM motors, as will be explained hereafter, while the tool support functions. First, the base 38a is moved into a desired location. Then, the tool support 40 is moved through the articulated legs 42a to position the supported tool in a location and attitude to engage work of some predetermined type. The tools are then actuated by moving arms 48a and 48b and using the pinchers 50a and 50b. When the work is engaged further movement by the tool support platform through the six degrees of freedom structure or other adjustment may be used to perform assigned tasks.

Figure 6:
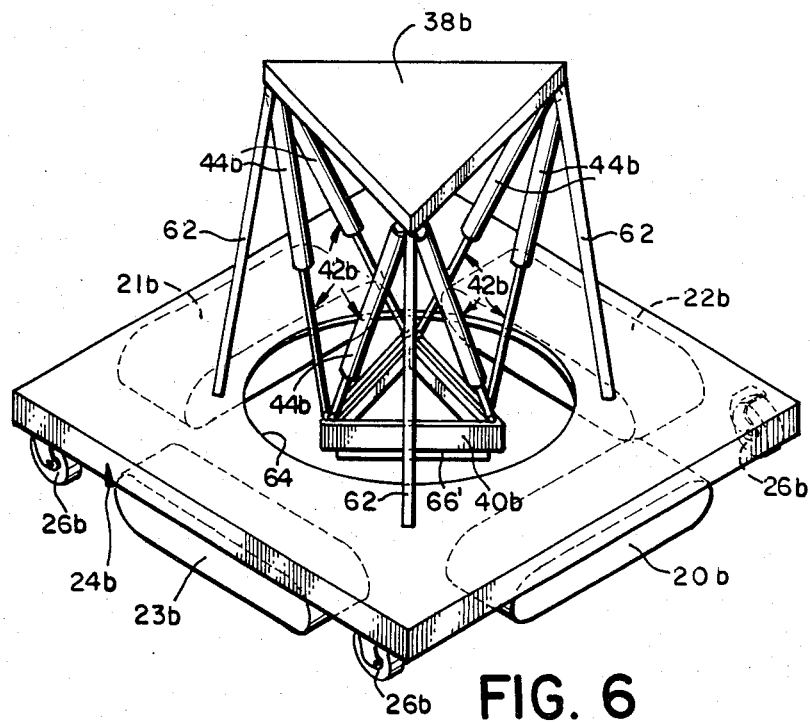
FIG. 6 is a robot platform having another form of tool supporting structure with a similar articulation of the supported tool.

A variation on the theme is shown in FIG. 6 wherein the base 38b is supported above the platform 24 by support columns 62. The base in this case is a triangular structure and the movable tool support 40b is also a triangular structure which projects down through a central opening 64 and supports a triangular scrapping tool 66. That triangular scrapping tool is positioned at various angles in positions relative to the supporting surface to contact the supporting surface as deemed appropriate by adjustment of the extension legs 42b using the hydraulic actuators 44b.

Figure 7:
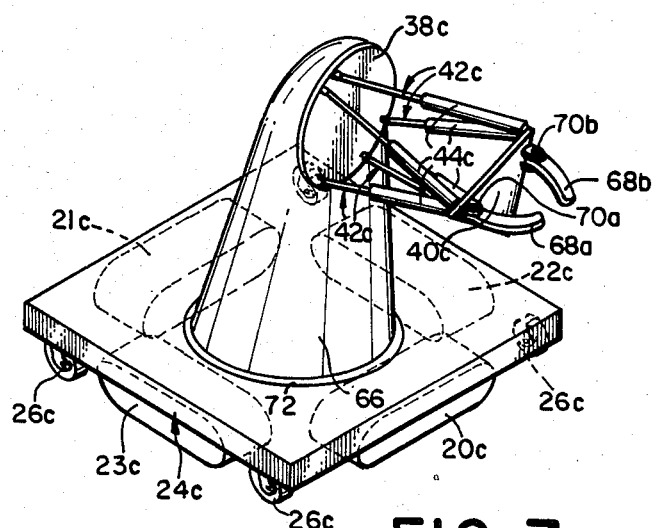
FIG. 7 illustrates still another robot platform with a different type of tool support.

The robot platform of FIG. 7 illustrates another use of an articulated synergistic device of providing six degrees of freedom. In this case, the base 38c is simply mounted on a hooded conical housing 66 having a circular opening providing a circumferential bearing lip in a plane generally perpendicular to the supporting surface against which bearing the circular base 38 may rest and rotate. Housing 66 houses suitable rotational drive means for the base of the tool support mechanism. In addition thereto, the positionable tool support 40c carries pivoted arms 68a and 68b whose pivot points 70a and 70b are generally parallel and opposed in order to permit the arms 68a and 68b to move toward and away from one another and to grasp structure between them and hold it against the deck of tool support 40c. The position of the platform is determined partially by rotation of base 38c but more specifically by the movement of the extensible legs 42c due to selective control of the actuators 44c. Additionally, the conical housing 66 may be a turret rotatably mounted to rotate about an axis, generally perpendicular to the platform surface on a bearing 72. The drive being enclosed within the housing.

Figure 8:
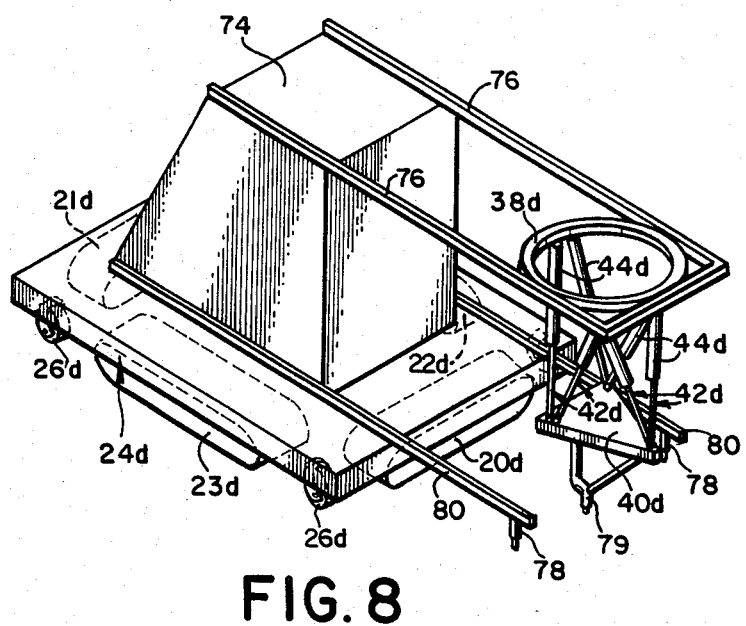
FIG. 8 represents still another robot platform with a totally different application but employing a similar articulation in the tool support.

FIG. 8 shows a further version of the robot platform showing a more specific kind of work to be accomplished, in this case, automatic welding of steel plates, as, for example, steel plates of a ship. In this case, the robot platform 24d supports an elevated pedestal 74 which, in turn, supports U-shaped beam 76 at the open end of the U. The cantilevered beam 76, in turn, supports a base in the form of ring 38d at the closed end of the U generally parallel to the robot supporting surface. The movable tool support 40d is positionable by the extensible legs 42d driven by hydraulic or other actuators 44d to enable universal positioning for the welding head 79. The synergistic motion is preferably part of a closed loop system which senses and positions the welding head 79 at the proper position and orientation to make a weld. Sensors 78 may be supported outboard from the platform 24d on beams 80 in a position bracketing the welding head 79. The platform, for example, can be programmed to move along an edge at slow speed and the sensors insure that it follows the edge and positions the welding head to make the weld as the platform moves. Additional sensors enable proper positioning of the six degree of freedom system carrying the welding head so that it will automatically lay a bead along the edge or into the gap between the plates. The robot platform can also carry sensing means to sense and inspect the weld once it is completed.

Figure 9:
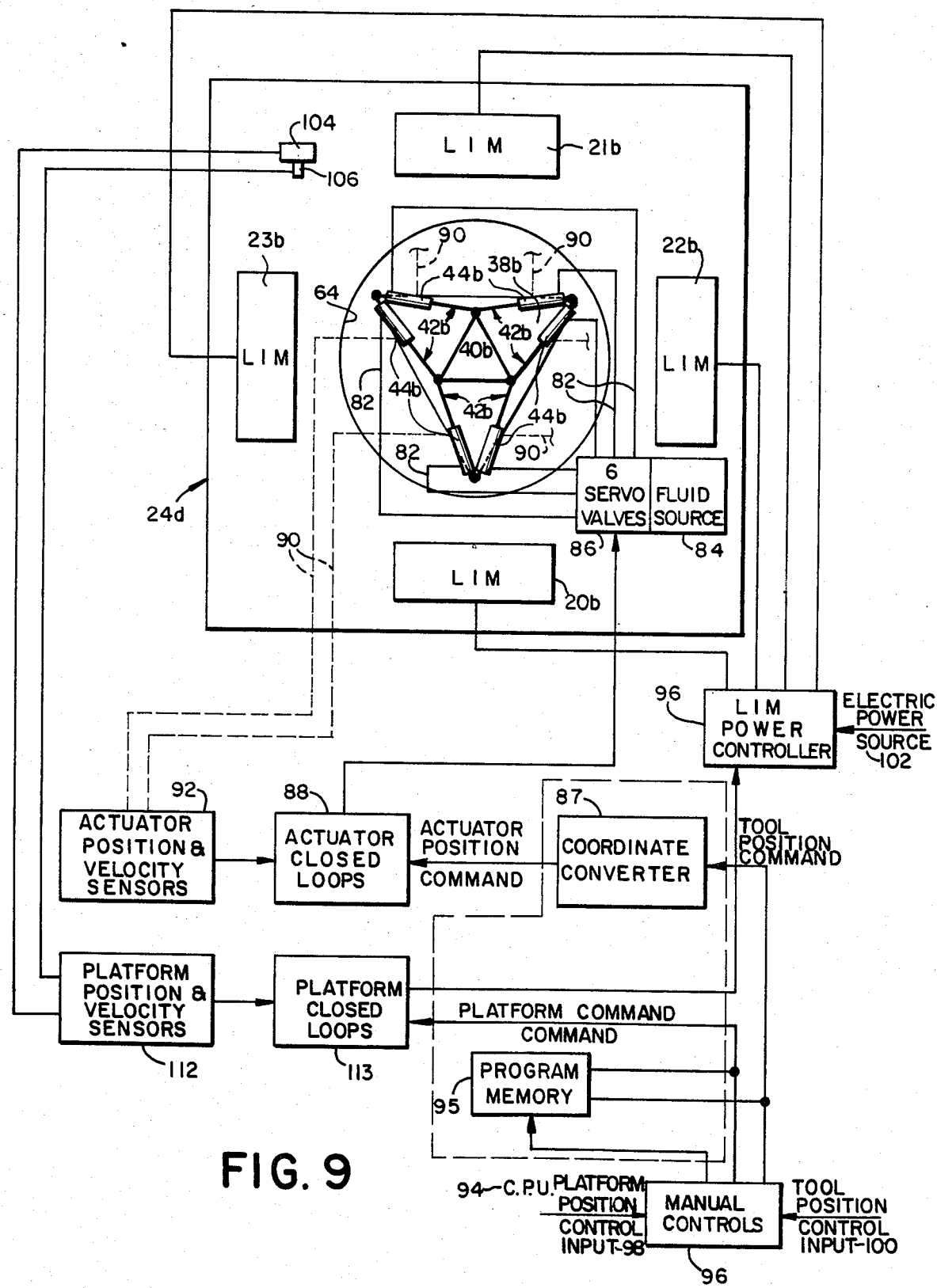
FIG. 9 is a schematic drawing showing schematically a system for controlling a robot platform in accordance with the present invention.

Referring now to FIG. 9, there is illustrated a schematic diagram of the system according to the present invention. In this diagram, the robot platform frame 24b of FIG. 6 is shown somewhat schematically whereby the base 38b of the articulation structure is regarded as transparent and the tool support 40b is shown merely in outline. The actuators 44b are shown schematically as part of their linearly extensible legs 42b. Also shown schematically in this diagram are fluid lines 82 to the hydraulic cylinders 44b, each of which in practice would be two lines, one to each end of each cylinder. The fluid is provided is provided from the fluid source 84 through individual servo valve means 86 with selectable actuators for each cylinder 44b which are selected and actuated by tool position command signal acting on coordinate converter 87 providing actuator position commands through actuated or closed loops 88 to each of the six servo valves 86, all structure being shown in FIG. 9 as a functional block. The amount of extension of each extensible leg 42b is detected by a sensor for each of the extensible legs connected by lines 90 to the actuator position and velocity sensor 92. The sensed information is fed back to the actuator closed loops 88 to stop each actuator when commanded position is achieved. A central processing unit CPU 94, preferably a mini computer, such as, for example, a PDP 11-34 which contains a program memory 95 and coordinate converter 87 for various purposes useful to the system, may be selected to program part of the tool position sequencing and platform positioning by means of the manual controls 96. A selected position of the tool support 40b to perform a particular predetermined operation can be chosen by manual controls 96 through tool position input 100. A position chosen may be then compared by the computer 94 to memory information in memory 95 and appropriate signals sent to the cylinder actuator selector 88 through the coordinate converter 87 to adjust the cylinders further to achieve the desired positioning until the selected tool support position is achieved, at which point the sensed and selected positions will correspond. It is also possible to put into memory selected sequential positions and to have sequential positioning done automatically without manual adjustment through the manual controls 96, possibly after initial manual positioning. On the other hand, positioning can be done manually using the tool position control input 100. This may include an analog positioning device or a plurality of manual input selection means for positioning the tool. Separate platform position control input means 98 is provided for the positioning the robot platform 24b relative to its supporting surface or changing its position in a way that can be visually observed and manually corrected or adjusted through controls 98.

The robot platform 24b may be visually positioned through the manual controls 96 using the manual input 98 which, in turn, aportions wave peaks from a drive pulse source 102 and as appropriate in a given case may also regulate their amplitude. In addition to manually positioning the platform 24b, the platform may be positioned by another part of the program memory 95 through the computer 94 in accordance with a preset program. In many applications, it will be desirable to monitor the position of the platform. This may be done in many ways, one of which is by providing sensing marks or other means on the supporting surface to be sensed by sensing members 104 and 106 on the platform. Alternatively, robot platform position may be monitored empirically by monitoring the angular position that various casters assume and their rates of revolution. Other means of position detection, such as an inertial measurement unit (IMU), of course, are also possible. Whatever means is provided lines 108 and 110, for example, are fed back to platform position and velocity sensing means 112 which may feed position information to the position information to the platform closed loops 113. In some cases, sensed position information is compared to converted signals for selected positions sometimes from the manual controls 96 and sometimes from program memory 95. Appropriately corrected drive signals are then fed to the various LIMs.

Application for robot platform and its associated tools are innumerable. As previously indicated in addition to flat horizontal supporting surfaces, the supporting surfaces can be curved and the robot platform can be modified to accommodate to a particular curved surface. Additionally, the system is well-suited for use in applications involving sloping surfaces or even vertical surfaces. In fact, due to magnetic forces involved, the robot platform can be held particularly to magnetic support surfaces with a sufficiently strong force that it can even travel upside down or with an upside down component.

Figure 10:
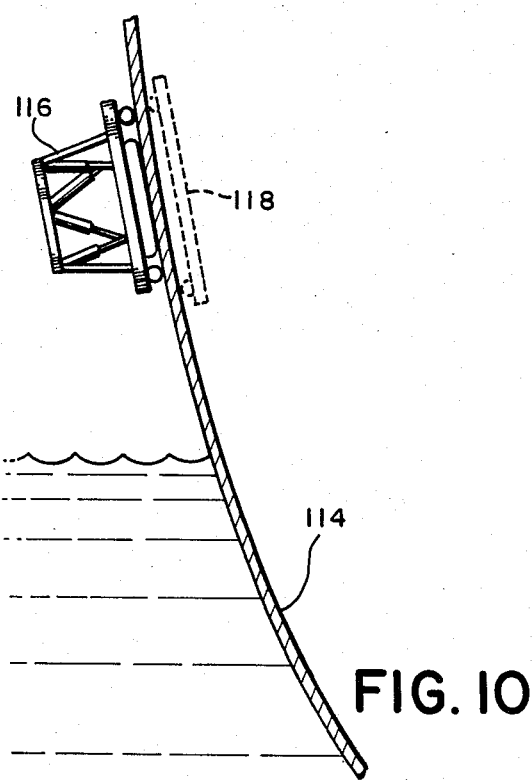
FIG. 10 shows one type of environmental use of a robot platform.
Figure 11:
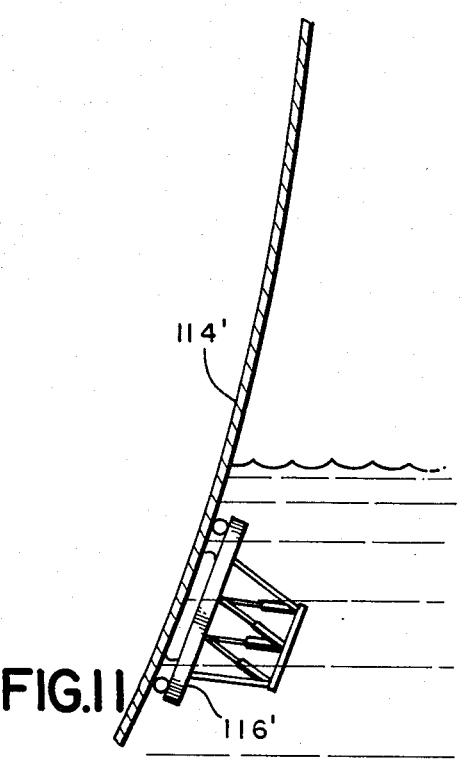
FIG. 11 shows a similar environmental use.

Typical of the contemplated use of robot platforms for tool support is the use in connection with the fabrication or repair of steel hulls of ships. The device of FIG. 8, for example, may be used for welding ship hull steel plates together when the plates are held in proper position relative to one another. As illustrated in FIGS. 10 and 11, the use of robots in connection with ship hulls can be particularly advantageous for such things as scraping and painting the hull or for doing work on the hull or structure protruding from the hull. FIG. 10 illustrates one type of robot platform and presumes that in a first case that the hull 114 of the ship is steel. and that a robot platform carrying LIMs 116 will be magnetically attracted to the steel of the hull. In an alternative case, represented by the dotted line structure 118, a dummy robot may be provided to carry magnetic core material on the opposite side of the hull and can move on the opposite side of the hull. A conductive hull would be necessary in any event for the LIMs to advance but the metal might be non-ferrous, aluminum or bronze, for example. In the usual case, the ship hull would be magnetic and, as shown in FIG. 11, even portions of tha hull 114 below the water line can be reached by the robot 116 provided that the LIMs and tool mechanisms are appropriately protected with materials impervious to water or sea water. Such a robot platform can be used for cleaning the hull beneath the water line including scraping it to remove barnacles and the like.

Figure 12:
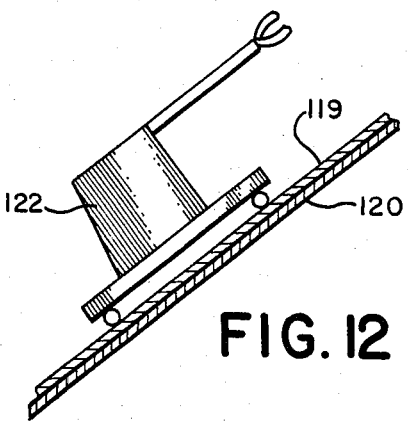
FIG. 12 shows a robot platform employing still a different type of support surface.

FIG. 12 shows a situation in which the supporting surface 119 is non-magnetic and non-conductive but a conductive layer 120 is made integral with the supporting surface. The LIM robot platform 122 is able to react with the conductive or magnetic surface 120 provided that critical spacing limitations are met.

In some cases, somewhat simplified platforms may be provided and the program may be simplified if a regular track is provided for the platform 122 to follow and there is no need for following another course. This would eliminate the need to either program or to manually direct the LIM and would simply involve starting or stopping it at an appropriate place.

The LIM-propelled robot platform is suitable for many ship-building and maintenance functions. It cannot only work on the inside and outside of the ship's hull but also under water. The motor is completely encapsulated and will function as well under water as it does in air; in fact, it can be operated at a higher thrust level because of the improved cooling effect of the water. Attention must be given to the platform design to account for the effects of hydrodynamics and salt water.

As mentioned earlier the force of magnetic attraction of a LIM to a steel reaction plate is approximately 10 times the rated thrust. This force is, of course, a function of the applied power so when no thrust is called for there is normally no attractive force. One way to maintain a force of attraction independent of thrust is to keep one electrical phase of the three-phase power constant and control thrust with the other two. The attractive force will then be approximately 3 times rated thrust.

An alternate method is to use separate DC electromagnets or permanent magnets to supplement the attractive force produced by the LIMs. This would be more efficient in the use of electric power and would provide the means to magnetically clamp the mobile platform into a fixed working position.

If electrical power fails, the LIM-propelled robot platform will lose its magnetic attraction, therefore means must be provided for retaining the platform relative to a non-horizontal surface. As above, permanent magnets or battery-powered DC electromagnets can be included with enough capacity to keep the platform from falling. In all cases, as an ultimate safety consideration, the platform should be fitted with a limited-motion tethering cable that will allow for the required working displacements yet catch it short of a catastrophic disengagement.

While the above description has been directed to preferred embodiments of the invention, it will be understood by those skilled in the art that many variations in addition to those specifically mentioned will occur to those skilled in the art. All such variations and modifications within the scope of the appended claims are intended to be within the scope and spirit of the present invention.

We claim:

1. A self-propelled robot platform for cooperative use in connection with a support surface permitting magnetic interaction between the platform and the support structure comprising:
   a frame;
   a plurality of frame support members supported on the frame, adapted to cooperate with the support surface to support and space the frame from the surface and permitting movement over the support surface in any selected direction;
   at least two linear motor means fixed to the frame transversely to one another and generally parallel to the support surface in position to magnetically link the support surface or means generally conforming to the support surface such that, by a combination of signals to the respective transversely positioned motor means, the motor means can drive the platform in a variety of selected directions and along a selected path or pattern; and
   tool support means including articulation structure permitting tool position adjustment, whereby a tool supported by the tool support means may do predetermined work at predetermined locations of the platform.

2. The self-propelled robot platform of claim 1 in which the robot platform cooperates with a generally horizontal support surface of conductive material or of material integral with a conductive material.

3. The self-propelled robot platform of claim 1 in which a support surface is provided which at least in part departs from the horizontal and employs a magnetic material for the support surface or integral with the support surface.

4. The self-propelled robot platform of claim 1 in which the support surface includes no magnetic material but provides a dummy magnetic robot platform on the opposite side of the support surface providing magnetic material to complete the magnetic flux path of at least one of the linear motor means and which is arranged to follow the self-propelled robot platform as it moves about the supporting surface.

5. The self-propelled robot platform of claim 1 in which the frame support members are provided by means providing and retaining rolling members capable of rolling relative to the support surface.

6. The self-propelled robot platform of claim 5 in which the frame support members are casters having wheels at least one of which swivels.

7. The self-propelled robot platform of claim 6 in which the platform is designed to move primarily in one direction and is provided with a front swiveling wheel ahead of the linear motor means in the direction of primary movement.

8. The self-propelled robot platform of claim 6 in which the frame support members include a plurality of swiveling caster members.

9. The self-propelled robot platform of claims 7 or 8 in which sensing means are provided to sense the angle of movement from the swiveling of at least one of the wheels and further means is provided to measure the linear movement based upon the rotation of the wheels.

10. The self-propelled robot platform of claim 1 in which the linear motor means are arranged in a "T" pattern on the frame with the cross bar of the "T" being transverse to a preferred direction of movement.

11. The self-propelled robot platform of claim 10 in which the plurality of frame support members include a swiveling caster in front of the "T" configured motor means in the preferred direction of travel.

12. The self-propelled robot platform of claim 11 in which sensor means are provided to sense direction of the swivel and linear distance covered by the wheel of the front caster.

13. The self-propelled robot platform of claim 1 in which there are provided at least one pair of parallel spaced linear motors enabling repositioning of the platform by causing the fields to move in reverse directions.

14. The self-propelled robot platform of claim 1 in which there are two pairs of parallel linear motor means in a mutually transverse arrangement and the plurality of frame support members is in the form of at least three swiveling casters having wheels rolling on the support surface and in which sensing means is provided to sense the direction of swivel and the distance covered by the wheels of at least two casters.

15. A self-propelled robot platform for cooperative use in connection with a support surface permitting magnetic interaction between the platform and the support structure comprising:
 a frame;
 a plurality of frame support members rotatably supported on the frame, adapted to cooperate with the support to support and space the frame from the surface and permitting movement over the support surface in any selected direction;
 at least one linear motor means fixed to the frame in position to magnetically link the support surface or means generally conforming to the support surface such that the motor means can drive the platform in directions determined by track means integral with the surface.

16. A system for positioning and operating a tool supporting self-propelled robot platform in relation to a supporting surface for the platform comprising:
 a frame;
 a plurality of frame support members supported on the frame, adapted to cooperate with the supporting surface to support and space the frame from the surface and permitting movement over the support surface in any selected direction;
 at least two linear motor means fixed to the frame transversely to one another and generally parallel to the support surface in position to magnetically link the support surface or means generally conforming to the support surface such that, by a combination of signals to the respective transversely positioned motor means, the motor means can drive the platform in a variety of selected directions and along a selected path or pattern;
 tool support means including articulation structure and associated drive means permitting tool position adjustment, whereby a tool supported in the tool support means may be made to do work at selected locations of the platform;
 input means for selected platform movement and tool operation;
 direction and selection control means responsive to input means to select which of the linear motor means is actuated and when and in what sequence;
 power control means for connecting the respective linear motor means to an electric power source and responsive to the selection and direction control means for generating motor drive signals for the motor means to cause movement of the platform relative to the support surface; and
 tool position coordinate converter means coordinating input signals and directing them to appropriate drive means to move the drive means in proper sequence and at a rate to accomplish movement selected at the input.

17. The system of claim 16 in which the input means includes both manual controls and computer controls including program memory for at least one of the power control means for the linear motion and the tool position converter means.

18. The system of claim 17 in which the input means provides platform position command signals to a platform closed loop system which, in turn, controls the power control means and platform position sensing means are provided to feed back signals to the platform closed loop to correct the output to the power control means.

19. The system of claim 17 in which the input means feeds tool position command signals to the coordinate converter which, in turn, drives individual drive means for the tool support means and means is provided for sensing the position and velocity of the drive means or the structure driven thereby and generating signals and feeding back those signals to modify the individual signals to the respective drive means.

20. A method of moving a tool over a supporting surface which comprises mounting the tool on an articulated support means carried by a platform movable over said supporting surface holding the platform against the support surface and moving the platform relative to the support surface by the magnetic field generating means of at least two linear motors.

21. The method of claim 20 in which the support surface is magnetic material and the field generating means of the at least two linear motors magnetically holds the platform to the supporting surface.

22. The method of claim 20 in which the support surface is non-magnetic but is provided by magnetic means backing the support surface.

23. The method of claim 22 in which the magnetic field engages magnetic material in another platform on the opposite side of the support surface which other platform is movable with the robot.

* * * * *